United States Patent
Spies

(10) Patent No.: US 9,850,949 B2
(45) Date of Patent: Dec. 26, 2017

(54) TEMPERATURE COMPENSATION RING, BEARING RING, AND BEARING ASSEMBLY

(71) Applicant: Rainer Spies, Donnersdorf (DE)

(72) Inventor: Rainer Spies, Donnersdorf (DE)

(73) Assignee: AKTIEBOLAGET SKF, Gothenburg (SE)

( * ) Notice: Subject to any disclaimer, the term of this patent is extended or adjusted under 35 U.S.C. 154(b) by 42 days.

(21) Appl. No.: 14/960,691

(22) Filed: Dec. 7, 2015

(65) Prior Publication Data

US 2016/0195134 A1 Jul. 7, 2016

(30) Foreign Application Priority Data

Dec. 5, 2014 (DE) .................... 10 2014 225 029

(51) Int. Cl.
*F16C 19/24* (2006.01)
*F16C 33/58* (2006.01)
*F16C 23/08* (2006.01)
*F16C 25/08* (2006.01)
*F16C 43/04* (2006.01)
*F16C 27/04* (2006.01)
*F16C 33/62* (2006.01)
*F16C 19/52* (2006.01)

(52) U.S. Cl.
CPC .............. *F16C 33/58* (2013.01); *F16C 23/08* (2013.01); *F16C 25/08* (2013.01); *F16C 27/04* (2013.01); *F16C 33/586* (2013.01); *F16C 43/04* (2013.01); *F16C 19/525* (2013.01); *F16C 33/62* (2013.01)

(58) Field of Classification Search
CPC ........ F16C 19/525; F16C 23/08; F16C 33/58; F16C 33/586; F16C 33/62; F16C 43/04
USPC .................................................... 384/493, 557
See application file for complete search history.

(56) References Cited

U.S. PATENT DOCUMENTS

| | | | | |
|---|---|---|---|---|
| 5,028,152 A * | 7/1991 | Hill | ........................ | F16C 19/364 384/557 |
| 8,356,944 B2 * | 1/2013 | Fox | ........................ | F16C 19/548 384/563 |
| 8,684,608 B2 * | 4/2014 | Ince | ........................ | F16C 19/182 384/493 |
| 2015/0117807 A1 * | 4/2015 | Spies | ..................... | F16C 33/586 384/476 |
| 2015/0308504 A1 * | 10/2015 | Katsaros | ................. | F16C 25/08 384/125 |

* cited by examiner

*Primary Examiner* — James Pilkington
(74) *Attorney, Agent, or Firm* — Bryan Peckjian; SKF USA Inc. Patent Dept.

(57) ABSTRACT

A temperature compensation ring configured to compensate for changes in a temperature-dependent distance between two components includes a base body made from an elastic material and a first reinforcing body and a second reinforcing body, each of the first and second reinforcing bodies including a harder material than the material of the base body. The first and second reinforcing bodies are disposed at opposite end surfaces of the base body and partially define an outer periphery of the temperature compensation ring.

10 Claims, 5 Drawing Sheets

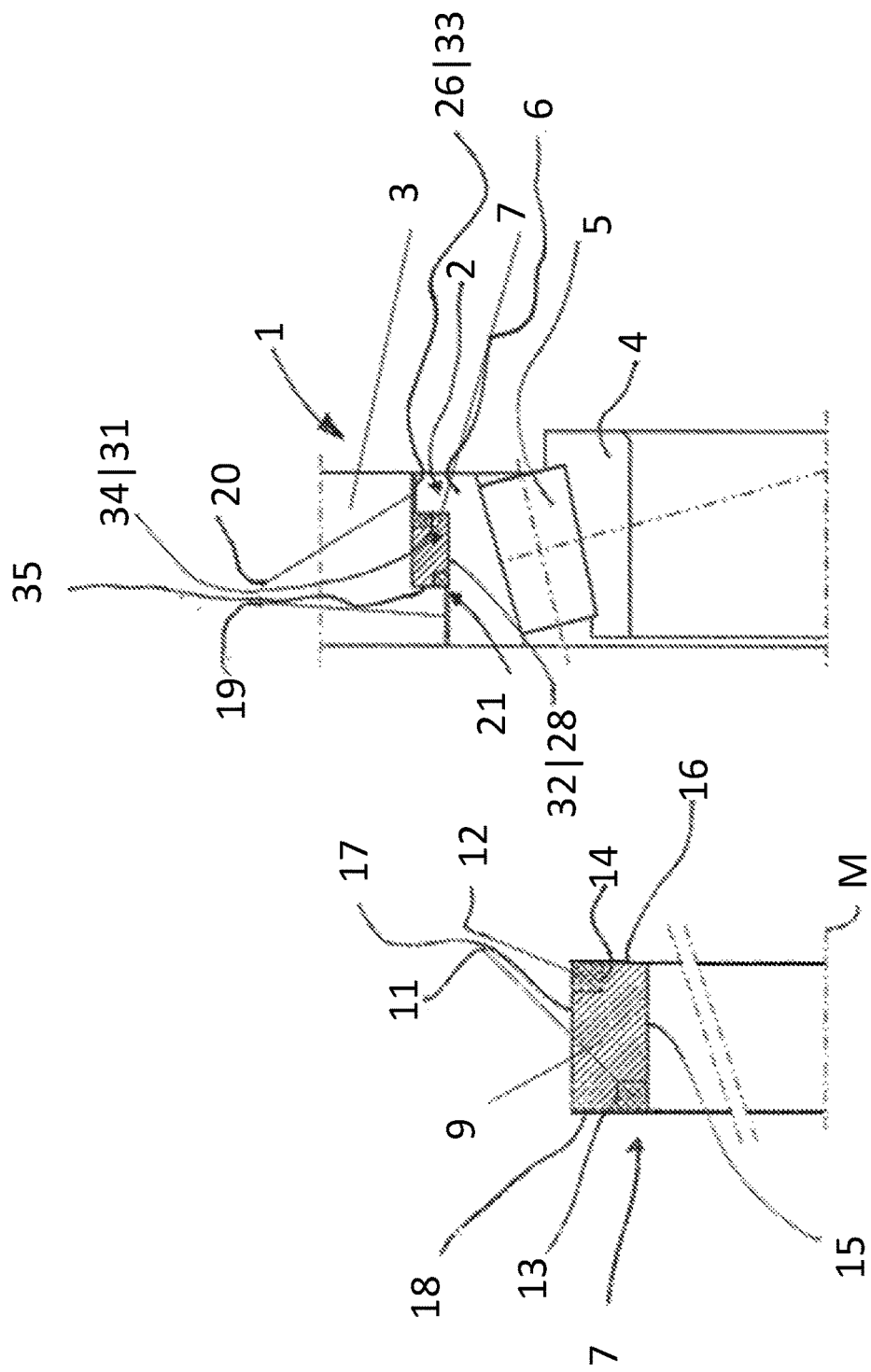

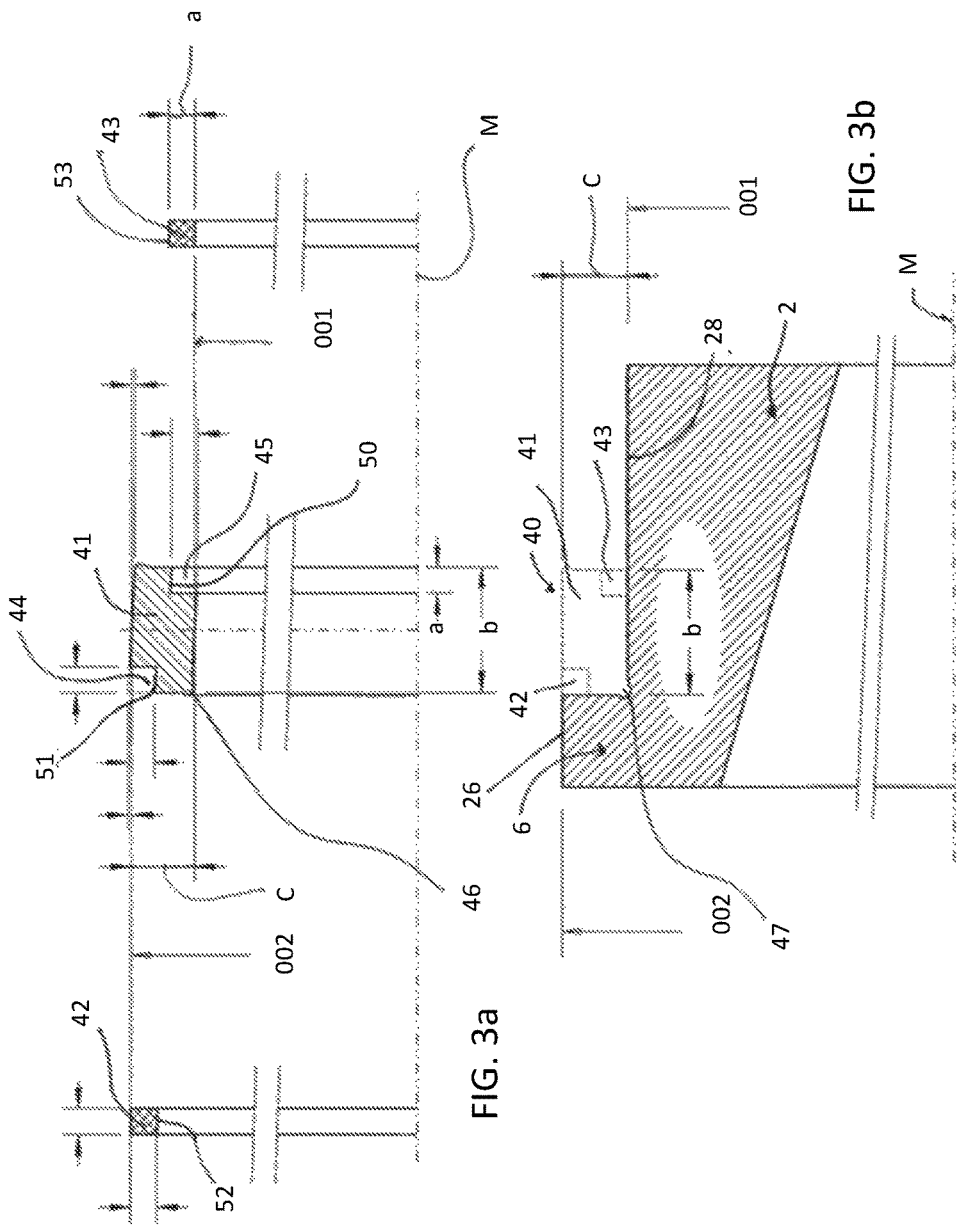

TEMPERATURE COMPENSATION RING, BEARING RING, AND BEARING ASSEMBLY

CROSS-REFERENCE

This application claims priority to German patent application no. 10 2014 225 029.3 filed on Dec. 5, 2014, the contents of which are fully incorporated herein by reference.

TECHNOLOGICAL FIELD

Exemplary embodiments relate to a temperature compensation ring, a bearing ring including the temperature compensation ring, and a bearing assembly including the bearing ring.

BACKGROUND

Many components, including bearings, may be exposed to and need to operate under different temperature conditions. In some cases the bearing or bearing components are disposed on devices or structures that do not respond to temperature changes in exactly the same way the bearing or bearing component responds. For example, the devices or structures can expand or deform differently in response to temperature changes. This may occur, for example, in rolling-element bearings used in an aluminum housing. Such rolling-element bearings therefore may include temperature compensation elements between the rolling-element bearing ring and the housing.

Rolling-element bearings are known that have a flange on their outer ring. An elastomer ring may be disposed adjacent to the flange and function as a temperature compensation element. For this purpose the elastomer ring may be pushed or pressed onto the outer ring. The elastomer ring usually has a very high thermal expansion coefficient. If the outer ring and the housing expand at different rates, the elastomer ring should expand at such a rate that, at least in the axial direction, no clearance arises between the housing and the outer ring. This can happen, for example, with a temperature increase or temperature change. The elastomer ring should thus compensate for an increase in clearance which can arise, for example, at an operating temperature.

In order to allow the outer ring to move in the housing a clearance is often provided between the outer ring and the housing. In addition, under operating loads, conventional polymer rings often behave like a fluid. Under an applied load, the rubber-type material can thus also be displaced into the two gaps between the housing and the outer ring (which can also be configured as a flange outer ring). This process can be referred to as "gap extrusion." Under unfavorable conditions, such as when there is an alternating mechanical load, the temperature compensation ring can fray at an affected edge and a material loss can thereby occur. This material loss can possibly reduce a length-compensation capability of the temperature compensation ring or of a temperature compensation bearing. This is undesirable, and under certain circumstances can even occur with temperature compensation rings that are disposed between components other than the bearing ring and the housing.

SUMMARY

There is therefore a need to provide a better compromise between the ease of installation of a bearing ring and the ability to reliably compensate for a clearance with respect to another component. This need is addressed by a temperature compensation ring, a bearing ring, or a bearing assembly according to the disclosure.

Exemplary embodiments relate to a temperature compensation ring that is configured to compensate for changes in a temperature-dependent distance between two components. The temperature compensation ring comprises a base body made from an elastic material and at least one first and one second reinforcing body, each of which includes a harder material than that of the base body. The two reinforcing bodies are disposed on opposing side surfaces of the temperature compensation ring, and they partially form the temperature compensation ring and its outer periphery.

Since the two reinforcing bodies do not extend completely over a side of the temperature compensation ring on which they are disposed, in some exemplary embodiments it is possible that the reinforcing bodies cover a gap and thus can prevent or at least reduce the gap extrusion described above. Nevertheless the temperature compensation ring can still have a good temperature-compensation ability, since the reinforcing body does not completely cover a side surface on which it is disposed and thus does not significantly limit the way the temperature compensation ring expands/deforms. For example, for this purpose the reinforcing bodies can be disposed on radially and/or axially opposing lateral surfaces.

In addition, the reinforcing bodies can be disposed in an obliquely opposing manner so that the first reinforcing body is disposed on an inner-circumferential edge of the temperature compensation ring and the second reinforcing body is disposed on an outer-circumferential edge of the temperature compensation ring. In some exemplary embodiments each of the reinforcing bodies may be disposed in a corner of the temperature compensation ring or form the temperature compensation ring, and thus form part of two adjacent side surfaces.

Additionally or alternatively, the base body can include a recess on each of two opposing edges, in which recesses a reinforcing body may be disposed such that the temperature compensation ring has a quadrangular or rectangular cross-section. In some exemplary embodiments the temperature compensation ring can thus be integrated into conventional temperature compensation bearings or a flange outer ring for a conventional temperature compensation bearing.

For example, at least one of the two reinforcing bodies can be disposed on the base body without using adhesive. Since in some exemplary embodiments the reinforcing body is only placed on the base body, another attaching, for example, adhesive bonding, welding, or the like, can be omitted. During installation, under certain circumstances the reinforcing body and the base body can be held together only by a clamping between two components on either side of the temperature compensation ring. Of course, in other exemplary embodiments the reinforcing bodies can also be adhesively bonded to the base body or attached thereto in any other manner.

In order to allow for adhesive-free assembly, in some exemplary embodiments at least one of the reinforcing bodies can include a conical bore. For example, it can be a radially outwardly disposed reinforcing body. In an assembled state the bore may taper away from the centerline. In an analogous manner at least one of the reinforcing bodies can have a conical, radially outwardly oriented outer surface. It can be, for example, the radially inwardly disposed reinforcing body. An outer diameter can, for example, increase with distance from the centerline of the base body. In some exemplary embodiments, the reinforcing body can be clamped via its bevels with the base body. In some cases adhesive can additionally be used for assembly.

The base body can optionally have a rhombic or parallelogram or diamond-shaped cross-section, especially in an unloaded state. The cutouts for the reinforcing bodies can correspond to the rhombic cross-section.

Additionally or alternatively, the base body can comprise an elastomer, and the at least one reinforcing body can comprise a plastic. In some exemplary embodiments the reinforcing body and the base body can have similar thermal expansion coefficients. For example, the thermal expansion coefficients of the material of the reinforcing body and of the base body may only differ by a factor of 0.1, 0.2, 0.3, 0.5 0.6, 0.7, 0.8, 1, or 2.

For example, the temperature compensation ring can be free of metal (non-metallic). In some exemplary embodiments this avoids the problem of the temperature compensation ring including materials having very different thermal expansion coefficients, for example, metal and polymer, which under certain circumstances can differ by a factor between 10 and 20.

The reinforcing body can have an extension or projection, parallel to a side surface, which it partially forms, that corresponds at most to a value of 0.8, 0.75, 0.6, 0.5, 0.45, 0.4, 0.3, 0.2, or 0.1 of a length of the side surface on which it is disposed. In some exemplary embodiments the base body can thereby also include a sufficient contact surface to the components between which it is disposed. In a direction perpendicular to the side surfaces on which the reinforcing body is disposed the reinforcing body can have the same or a similar length as in the direction parallel to the side surface.

Exemplary embodiments also relate to a bearing ring for a bearing that includes a temperature compensation ring according to at least one of the preceding exemplary embodiments, in which the base body is in contact with the bearing ring on at least two sides. In some exemplary embodiments it may be possible for the base body to have sufficient contact with the bearing ring such that under certain circumstances a sufficient temperature transfer can be made possible from the bearing ring to the base body.

In addition, the temperature compensation ring can be disposed on the bearing ring such that the first and the second reinforcing bodies each cover a region at which the bearing ring abuts on another component on which it is disposed. In some exemplary embodiments the reinforcing bodies may cover gaps and prevent or at least reduce gap extrusion, that is, substantially prevent the elastic material of the base body from being forced into gaps when a load is applied to the temperature compensation ring. The temperature compensation ring may be loosely pushed onto the bearing ring or molded onto the bearing ring.

Exemplary embodiments also relate to a bearing assembly including the bearing ring according to at least one of the preceding exemplary embodiments. The bearing ring is disposed on the second component such that a first gap and a second gap exist between the bearing ring and the second component, and the first reinforcing body completely covers the first gap, and the second reinforcing body completely covers the second gap. The reinforcing body may be larger than the gap but shorter than a side surface of the temperature compensation ring on which it is disposed. Here a component that covers a gap can completely or partially overlap or close the gap such that another material, for example, the material of the base body, cannot enter the gap or can only enter the gap with difficulty or in a reduced manner.

Exemplary embodiments also relate to a method for mounting a temperature compensation ring on a bearing ring. Here at least one mounting aid is disposed on a bearing ring. Using the mounting aid at least one first reinforcing body can be centered in the radial direction. The reinforcing body can be a reinforcing body that does not abut on the bearing ring in the radial direction or is spaced from the bearing ring in the radial direction by the base body. Then the first reinforcing body can be disposed on the bearing ring such that it is centered by the mounting aid. Optionally the base body and the second reinforcing body can then be mounted. The bearing ring can possibly include a chamfer, or an assembly aid can be provided with a chamfer, that facilitates a pushing-on of the base body or of the second reinforcing body, for example, that which abuts on the bearing ring in the radial direction.

Further advantages of the disclosure are described in more detail below with reference to the exemplary embodiments depicted in the drawings, but not limited to said exemplary embodiments.

BRIEF DESCRIPTION OF THE DRAWINGS

The Figures thus schematically show the following views.

FIG. 1 is a schematic cross-sectional view of a temperature compensation ring according to an exemplary embodiment.

FIG. 2 is a schematic cross-sectional view of a bearing assembly including the temperature compensation ring according to the exemplary embodiment of FIG. 1.

FIG. 3a is a schematic, exploded, cross-sectional view of a temperature compensation ring according to a further exemplary embodiment.

FIG. 3b is a schematic cross-sectional view of a bearing ring including the temperature compensation ring, depicted in dashed lines, of the exemplary embodiment of FIG. 3a.

FIG. 3c is an enlarged schematic cross-sectional view of a base body for the temperature compensation ring of FIG. 3a.

DETAILED DESCRIPTION

Figure 3C:
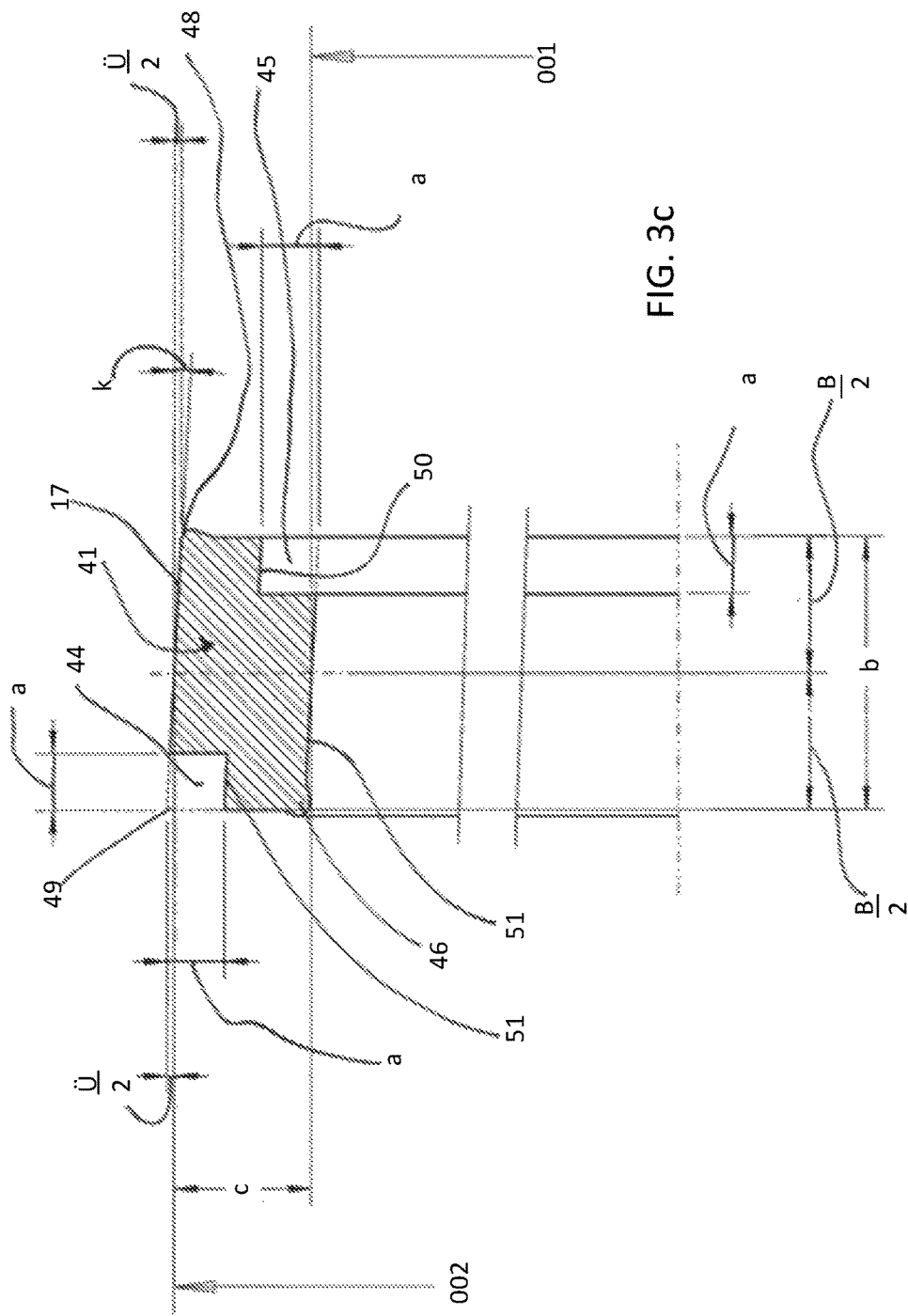

In the following description of the accompanying Figures, like reference numerals refer to like or comparable components. Furthermore, summarizing reference numerals are used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

FIG. 1 is a schematic cross-sectional view of a temperature compensation ring 7 according to an exemplary embodiment. The temperature compensation ring 7 is configured to compensate for temperature-dependent changes in a distance between two components not shown in FIG. 1. The temperature compensation ring 7 comprises a base body 9 made from an elastic material. Furthermore, the temperature compensation ring 7 comprises at least one first reinforcing body 11 and one second reinforcing body 12, each of which is formed of a harder material than the material of the base body 9. The two reinforcing bodies 11 and 12 are disposed on opposite side surfaces 16 and 18 of the temperature compensation ring 7 and partially define the temperature compensating ring itself.

The base body 9 has a very high thermal expansion coefficient. For example, the base body 9 can comprise fluoro rubber (FKM) or hydrogenated nitrile butadiene rubber (HNBR), a fluoroelastomer (for example, a fluoroelastomer available from DuPont Performance Elastomers under the trade name "Viton,"), acrylic rubber (ACM), an elastomer, or another rubber-like elastomer. The reinforcing bodies 11 and 12 can be made from, for example, a plastic, for example a polymer, for example, polyethylene (PE), polypropylene (PP), polyketone (PK), polyvinyl chloride (PVC), polytetrafluoroethylene (PTFE), polymethyl methacrylate (PMMA), polycarbonate (PC), polyethylene terephthalate (PET), polyethylene glycol (PEG), or from the group of polyurethanes (PU). The material or a material of the reinforcing bodies 11 and 12 can, for example, have a high Shore hardness and a viscous flow behavior, and an equal oil resistance and a similar thermal expansion coefficient to the material of the base body 9.

The reinforcing bodies 11 and 12, which may also be referred to herein to as reinforcing rings, each have a square cross-section and are of equal size. They can have identical or different cross-sections and be of identical or different sizes. In other, not-shown exemplary embodiments the reinforcing bodies can also have a different cross-sections, for example, triangular, rectangular with rounded edges, or the like. The two reinforcing bodies can possibly also have a different shape and/or size. In the exemplary embodiment of FIG. 1 exactly two reinforcing bodies are provided. In other, not-shown exemplary embodiments a different number of reinforcing bodies can also be provided, for example, depending on the gaps that are present.

The two side surfaces 16 and 18 on which the reinforcing bodies 11 and 12 are disposed are axially opposite each other in the axial direction M. The reinforcing bodies 11 and 12 are also disposed on radially opposite side surfaces 17 and 15, or the partially form radially opposite side surfaces. All four side surfaces 15 to 18 of the rectangular temperature compensation ring 7 are at least partially, but not completely, formed from the base body 9, and the reinforcing bodies 11 and 12 are disposed on obliquely opposite corners of the temperature compensation ring 7. The reinforcing body 11 is thus disposed on, or only partially forms, an inner circumference of the radially inwardly oriented side 15, and the reinforcing body 12 is thus disposed on, or only partially forms, the radially outwardly oriented side 17. Since the reinforcing bodies 11 and 12 are each disposed on a corner, they each partially form two mutually adjacent side surfaces of the temperature compensation ring 7.

The base body 9 is also annular and includes cutouts 13 and 14 for receiving or disposing the reinforcing bodies 11 and 12, respectively. The cutouts 13 and 14 are configured as depressions or grooves that each have a shape complementary to the shape of the reinforcing bodies 11 and 12. The reinforcing bodies 11 and 12 thus complement the base body 9 to form a rectangle. In a further, not-depicted exemplary embodiment the temperature compensation ring can also have another shape. For example, the reinforcing bodies can be disposed exclusively on a side surface oriented in the radial direction or exclusively on a side surface oriented in the axial direction. Reinforcing bodies that are disposed on opposite side surfaces can be disposed at the same height or at different heights depending on the position of the gaps to be covered.

FIG. 2 is a schematic cross-sectional depiction of a bearing assembly 1 including a bearing ring 2 and the temperature compensation ring 7 according to an exemplary embodiment. The bearing ring 2 is disposed on a second component 3 such that a first gap 19 and a second gap 20 exist between the bearing ring 2 and the second component 3. The first reinforcing body 11 completely covers (is radially thicker than) the first gap 19, and the second reinforcing body 12 completely covers (is radially thicker than) the second gap 20.

The bearing assembly 1 is a tapered roller bearing, and the bearing ring 2 is an outer ring. The bearing assembly 1 also comprises an inner ring 4. A plurality of tapered rollers is guided between the bearing ring 2 and the inner ring 4, of which one tapered roller 5 is depicted. The outer ring 2 includes a flange 6. This flange 6 serves to position the bearing ring 2 in the axial direction.

The second component 3 is a housing in which the bearing ring is disposed. The housing can be an aluminum housing of a transmission. Two tapered roller bearings, of which only one is depicted in FIG. 2, can be installed therein, for example in a face-to-face arrangement. At some operating temperatures clearances may increase due to the different materials of bearing ring 2 and component 3. The temperature compensation ring 7 is intended to compensate for these increased clearances by substantially preventing an axial clearance from arising in the axial direction M between the bearing ring 2 and the component 3.

The bearing ring 2 for the bearing 1 comprises a first region 28 on a radial outer surface 21 of the bearing ring 2, and a second region 26 on the radial outer surface 21 of the bearing ring 2. The second region 26 has a different, larger diameter than the first region 26 and forms the flange 6. An end surface 34 having at least one axial direction component is disposed between the first region 28 and the second region 26.

The two regions 28 and 26 each have a cylindrical shape and are connected in the axial direction, based on a center axis M, exclusively by the end surface 34. The end surface 34 and the first region 28 enclose a 90° angle. In some further, not-depicted exemplary embodiments the end surfaces 34 can also enclose a different angle with the first region. Additionally or alternatively, the end surface 34 can also include a shoulder.

The component 3 includes a first region 32 having an inner diameter that substantially corresponds to an outer diameter of the first region 28. Furthermore, the component 3 includes a second region 33 having an inner diameter that substantially corresponds to an outer diameter of the second region 26. The second component of the component 3 has a greater extension in the axial direction than the second region 26 of the bearing ring 22. The outer surface 20 is oriented radially outward. Thus in an assembled state a space exists between the component 3 and the bearing ring 2 in which the temperature compensation ring 7 is received, and the space is filled by the temperature compensation ring 7. The gaps 19 and 20 occur where the component 3 and the bearing ring 2 meet each other. The gaps 19 and 20 each extend parallel to an axial direction M. The gaps 19 and 20 are spaced from each other in the axial direction M and in the radial direction by the temperature compensation ring 7. In some further, not-depicted exemplary embodiments the gaps can also have a different arrangement with respect to one another, for example, due to a shape of the component. The gaps may only have a small width, for example, less than 0.01 mm or 0.02 mm.

In an assembled state the temperature compensation ring 7 abuts via an end surface 31 with interference fit on the end surface 34 of the bearing ring 2, and abuts with its radially inwardly oriented outer surface 37 on the first radially outwardly oriented region 28 of the bearing ring 2. Furthermore, the temperature compensation ring 7 abuts on the component 3 via its radially outwardly oriented ring outer surface 36 and the ring end surface 35, which faces away in the axial direction M from the second region 26 and the region 29 or 30.

In some further, not-depicted exemplary embodiments the temperature compensation ring can also be disposed between two other components that have gaps having different positions. Under certain circumstances the reinforcing bodies can then be disposed such that they cover the gaps, but do not completely form the side surfaces of the temperature compensation ring that cover the gap. The bearing ring can also have a different shape or be a bearing ring of a different bearing.

The reinforcing bodies 11 and 12 can be larger than the gap 19 or 20 that they cover, but shorter than a side surface of the temperature compensation ring 7 on which they are disposed. A component, for example, one of the reinforcing bodies, can completely or partially overlap or close the gap such that another material, for example, the material of the base body 9, cannot enter into the gap 19 or 20 or can only enter into the gap 19 or 20 with difficulty.

To manufacture the temperature compensation ring 7, two plastic rings which will form the reinforcing bodies 11 and 12 may be inserted in an injection mold at positions at which the gaps 10 and 20 between the outer ring 2 and the component 3 are located. Alternatively the reinforcing bodies 11 and 12 can be placed only loosely on the base body 9 rather than molded thereto.

Additionally or alternatively, in some exemplary embodiments a material of the bearing ring 2 differs from a material of the temperature compensation ring 7. The material used for each of the components should be selected to be conducive to the function of the component. The bearing ring 2 and the temperature compensation ring 7 can be two individual components that are not connected to each other. Optionally the bearing ring 2 and the temperature compensation ring 7 can also be connected to each other. The bearing ring 2 itself can comprise, for example, a steel, bearing steel, or the like.

In other words, some exemplary embodiments relate to a reinforced temperature compensation ring 7 for a tapered roller bearing having a temperature compensation function. In a tapered roller bearing that includes an outer ring with a flange, a polymer ring can be used as a temperature compensation ring. The ring is inserted between the outer ring and the housing and can compensate for a temperature-dependent change of length in an aluminum transmission housing. For this purpose the temperature compensation ring includes a first material and a second material that are different from each other. The second, harder, material is disposed in front of a gap between the housing and the flange ring. The temperature compensation capability of the bearing is not impaired.

FIGS. 3a to 3c show different schematic cross-sectional views of a temperature compensation ring 40 and of the bearing ring 2 according to a further exemplary embodiment or its individual parts. The temperature compensation ring 40 is essentially similar to the temperature compensation ring 7 and also comprises a base body 41 and two reinforcing bodies 42 and 43. Both reinforcing bodies 42 and 43 are hollow cylinders. The temperature compensation ring 40 differs from the temperature compensation ring 7 in its shape or in a shape of the base body 41 in an unloaded state. In FIG. 3b the bearing ring 2, which can also be referred to as the flange outer ring, of the tapered roller bearing is depicted. A flange outer diameter at the first region 28 is indicated by OD1, and a diameter at the second region 26 is indicated by OD2. Macrogeometrically, in an assembled state the temperature compensation ring has a rectangular cross-section having a side length b and a shorter side length c. Extra material in the form of a bump or projection 46 can be provided to better fill an undercut or space, such as undercut 47 on ring 2 in FIG. 4. In other, not-depicted exemplary embodiments these projections can be omitted. At the two other corners cutouts 44 and 45 are applied, which in an installed state can have a rectangular shape, into which the reinforcing bodies 42 and 43 can be fitted or inserted.

The temperature compensation ring 40 should form a relatively tight seat on the bearing ring 2. In some exemplary embodiments individual parts may be prevented from detaching during assembly. For conventional temperature compensation rings made completely from a rubber this is achieved by an overlap of at least 0.2 mm with respect to the outer ring. Due to a different elastic behavior of the reinforcing bodies 42 and 43, which can be manufactured, for example, from hard plastic, and the base body 41, which can be manufactured, for example, from a rubber, in some exemplary embodiments under unfavorable circumstances difficulties can arise during assembly and/or possibly also during operation, with an identical overlap for the reinforcing bodies and the base body.

In analogous manner to the already-described exemplary embodiment the two reinforcing bodies 42 and 43 may be produced separately from a plastic. The base body 41 can be cast separately from a rubber or another elastic material. A first cutout 44 and a second cutout 45 for the reinforcing bodies 42 and 43 can be formed in the base body 41. Compared to vulcanizing the reinforcing body in the temperature compensation ring 7, in some exemplary embodiments a flowing-around of the reinforcing body or a skin formation can thus be prevented or at least reduced.

In a non-installed state the base body 41 has a non-rectangular or diamond-shaped cross-section. In other words, the long and short sides of the rectangle may not form 90 degree angles. In the exemplary embodiment of FIG. 3a or FIG. 3c, in addition to the cutouts 44 and 45 a projection 46 is also formed-on or integrally molded with the base body 41 to fill an undercut 47 in a component on which the base body 41 is mounted. In a center of a temperature compensation ring width b, which can also be referred to as width extension and describes a length of the temperature compensation ring along an axial direction M, the base body 41 has an outer diameter OD2 and an inner diameter OD1, i.e., the diameter of the bearing ring 2. A rhombus angle K, i.e., an angle formed by the side 17 and the outer diameter OD2, or also between the side 15 of the base body 41 and the inner diameter OD1, results from the arctangent of a minimum overlap u divided by a temperature compensation ring width b. This can be expressed by the formula $$\tan(K) = (u/b).$$

Here the minimum overlap u is twice the distance by which in an unloaded state the base body 41 or the temperature compensation ring 40 is spaced radially inward on its axial end 48 from the outer diameter OD2. In the same way it can also serve as a distance by which an axially outer-lying and radially outer-lying edge 49 of the reinforcing body 44 radially outwardly overlaps the outer diameter OD2. The rhombic cross-section of the base body results from the angle K at which the sides 15 and 17 are disposed. The rhombus angle K of the base body 41 is exaggerated for clarity. Assuming a minimum overlap of u=0.2 mm and a width of 12 mm, then a rhombus angle arises, for example, of approximately K=1°. However, the rhombus angle need not be based on the minimum overlap, but rather can also be based on larger overlaps. In some further, not-depicted exemplary embodiments the sides of the base body can also enclose an angle with the diameters of the bearing ring that falls in an angle range that differs from the rhombus angle K in each direction by up to 1°, 5°, 10°, or 15°.

Figure 3D:
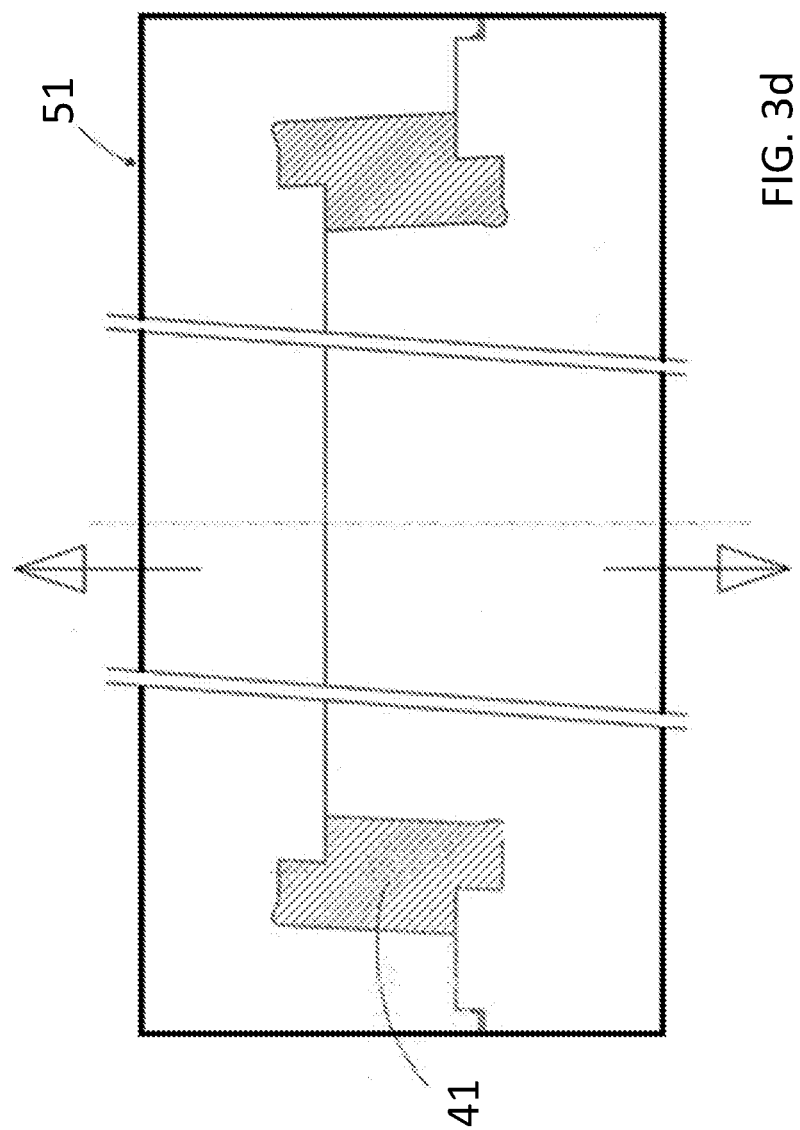
FIG. 3d is a schematic cross-sectional view of the base body for the temperature compensation ring in an injection mold.

FIG. 3d is a schematic cross-sectional view of the base body 41 for the temperature compensation ring 40 in an injection mold. The base body 41 can be axially removable therefrom. In some further, not-depicted exemplary embodiments the base body can be manufactured in a another manner, for example, punching, stamping, milling, casting, or the like.

The reinforcing body 42 abutting on the flange 6, which can also be referred to as the outer-ring flange, also has the outer diameter OD2 and a length a in the axial and in the radial direction, which length a can also be referred to as the cross-sectional extension or width. The opposite reinforcing body 43 has a bore diameter OD1 and also the side length a. The reinforcing bodies 41 and 42 thus have diameters that correspond to a diameter of the base body in the center of its axial extension. Depending on the intended use, individual geometric parameters can have different tolerances to ensure a tight seat.

Due to the substantially rhombic cross-section of the base body 41, a bore 52 of the reinforcing body 42 has a smaller diameter than an outer diameter 52 of the cutout 44. The two parts are joined by the base body 41 being slightly compressed on the diameter or the abutment surface 51. The two parts are held together due to the built-in overlap. In an analogous manner an overlap also arises between an outer diameter 53 of the reinforcing body 43 and a bore or the abutment surface 50 of the cutout 45. During assembly the bore or the abutment surface 50 of the base body 41 can be widened slightly. Thus the two parts 41 and 43 also hold together. The joining of the base body 41 with the two reinforcing bodies 42 and 43 can occur without adhesive. However, adhesive can also potentially be used. In some exemplary embodiments the reinforced temperature compensation ring 40 is already preassembled into an integral component prior to installation and thus will not fall apart during mounting on the bearing ring. After installing the reinforced temperature compensation ring 40 between two components, it can assume a substantially rectangular cross-section. In other words, the reinforcing bodies 42 and 43 and the cutouts 44 and 45 are configured such that the reinforcing bodies 42 and 43 are held with interference fit in the cutouts 44 and 45.

FIG. 3d is a schematic cross-sectional view of the base body 41 for the temperature compensation ring 40 in an injection mold 54. The base body 41 can be axially removable therefrom. In some further, not-depicted exemplary embodiments the base body can be manufactured in a another manner, for example, punching, stamping, milling, casting, or the like.

Figure 4:
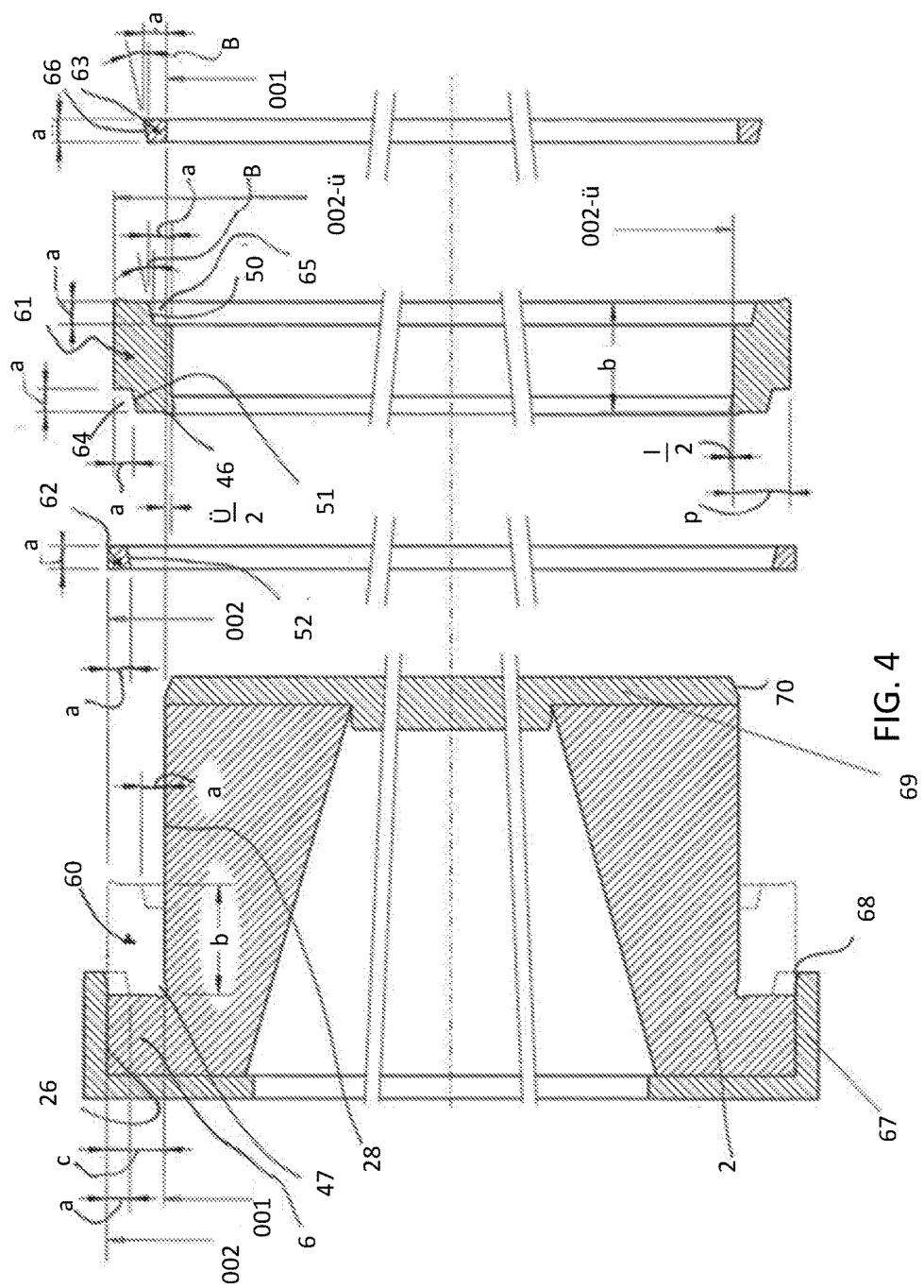
FIG. 4 is a schematic, exploded, cross-sectional view of a bearing ring including a temperature compensation ring according to a further exemplary embodiment.

FIG. 4 is an exploded schematic cross-sectional view a bearing ring 2 including a temperature compensation ring 60, depicted in dashed lines, according to a further exemplary embodiment. Temperature compensation ring 60 is substantially similar to the already-described temperature compensation rings, but differs from the temperature compensation ring 40, which is completely premounted on the bearing ring 2 prior to assembly, in that the temperature compensation ring 60 is mounted together with the bearing ring 2.

The temperature compensation ring 60 includes a base body 61 and two reinforcing bodies 62 and 63. Together, these have a substantially rectangular cross-section with side lengths b and c. In the exemplary embodiment the projection 46 for filling the contour of the undercut 47 and the undercut geometry of the opposing housing bore are cast-on/molded in. In some further, not-depicted exemplary embodiments these contours can also be omitted, and the temperature compensation ring can have a completely rectangular cross-section. Rectangular cutouts 64 and 65 having the side length a are provided on each of the two other corners of the base body 61. These serve, as already described for the other exemplary embodiments, for respectively receiving a reinforcing body 62 or 63. The cutouts 64 and 65 each have an installation bevel β. The installation bevel β is found on each of the abutment surfaces 50 and 51 on which the reinforcing bodes 62 and 63 abut in the radial direction on the base body 61 in an assembled state.

In an analogous manner to the previous exemplary embodiment the bearing ring 2 has the diameter OD1 at the first region 28 and the diameter OD2 at the second region 26. The base body 61 has an outer diameter that is equal to OD2−u. Here an overlap in an assembled state between the base body 61 and the bearing ring is specified by u. In the radial direction the base body 61 has a cross-sectional extension c and the width b.

The reinforcing body 62 abutting on the flange 6, i.e., the radially outwardly disposed reinforcing body, has an outer diameter OD2 and a side length a, which can also be referred to as the cross-sectional extension or width. A bore diameter 52 of the radially outwardly disposed reinforcing body 62 also has an insertion bevel β and is thus cone-shaped, such that a diameter of a side facing the flange 6 in an assembled state has a smaller inner diameter than the side facing away from the flange 6.

The opposite reinforcing body 63, which is disposed radially inward, has a cylindrical bore diameter OD1 and a width a. In an analogous manner to the base body 61 the reinforcing body 63 has an insertion bevel β on a radially outwardly oriented outer surface 66. As described above, the tolerances of the components can be set with respect to one another such that a tight seat results. Both reinforcing bodies 62 and 63 have a quadrangular cross-section, two angles of which are right angles. The insertion bevel β on the base body 61 and the insertion bevel β on each of the reinforcing bodies 62 and 63 each have the same slope.

As mentioned above, mounting the two reinforcing bodies 62 and 63 and the base body 41 occurs together with the bearing ring 2 or thereon. A first mounting aid 67 is used. The mounting aid 67 has the shape of a bush/sleeve, and a cylindrical part of the mounting aid 67 engages over the flange 6 in the radial direction and overlaps in the axial direction M up to the first region 28, for example, at least or exactly by an axial length of the reinforcing body 62. The bearing ring 2 is horizontally inserted into the first mounting aid 67. Thereafter the reinforcing body 62 is inserted and is centered by the mounting aid 67. In order to facilitate assembly, the mounting aid includes a chamfer 68 on its radially inwardly oriented side. In some exemplary embodiments the chamfer can be omitted or can have another shape.

Next, the base body 61 is mounted. For this purpose a second mounting aid 69 can be used, which includes a chamfer 70 on its radially outwardly oriented side, which chamfer 70 widens the smaller bore diameter of the base body 61 when the base body 61 is pushed onto the second mounting aid 69. A minimum bore diameter is OD1−u−i, wherein i is twice the extension of the projection 46. In other exemplary embodiments the minimum bore diameter can be OD1−u.

After the pushing-on a slight overlap u should result between the reinforcing body 62 and the base body 61. Finally the reinforcing body 63 is pushed onto the bearing ring 2. The slight overlap u arises between the second reinforcing body 63 and the base body 61. The overlap u can be, for example, 0.5%, 1%, 2%, or 5% of a diameter of the temperature compensation ring.

A temperature compensation ring, bearing ring, or bearing assembly according to at least one of the exemplary embodiments can be used in all possible applications and not just in transmissions having an aluminum housing or tapered roller bearings in face-to-face arrangement. For example, a bearing ring or outer ring according to at least one of the exemplary embodiments can be used in any bearing. Furthermore, the bearing ring or outer ring can be used in a sliding bearing or rolling-element bearing on which axial forces act. The bearing ring or the bearing can optionally be used for all possible bearing assemblies, for example, in vehicle transmissions, trucks, automobiles, machinery, construction vehicles, or the like. Furthermore, the bearing ring or the bearing assembly according to exemplary embodiments can also be used for bearings of moving components, in other applications, for example, machine tools, machinery, vehicles, or the like.

The exemplary embodiments and their individual features disclosed in the above description, the following claims, and the accompanying Figures can be meaningful and implemented both individually and in any combination for the realization of an exemplary embodiment in its various designs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A temperature compensation ring configured to compensate for changes in a temperature-dependent distance between two components, comprising:
   a base body made from an elastic material, and
   a first reinforcing body and a second reinforcing body, each of the first and second reinforcing bodies comprising a harder material than a material of the base body,
   wherein the first and second reinforcing bodies are located at opposite end surfaces of the base body and partially define an outer periphery of the temperature compensation ring,
   wherein the first and second reinforcing bodies are located in an obliquely opposing manner so that the first reinforcing body is disposed on an inner circumferential edge of the base body and the second reinforcing body is disposed on an outer circumferential edge of the base body.

2. The temperature compensation ring according to claim 1, wherein the base body includes first and second recesses on first and second opposing edges, and wherein the first reinforcing body is disposed in the first recess and the second reinforcing body is disposed in the second recess.

3. The temperature compensation ring according to claim 1, wherein, the first reinforcing body is disposed in a recess of the base body without adhesive.

4. The temperature compensation ring according to claim 1, wherein the temperature compensation ring is non-metallic.

5. The temperature compensation ring according to claim 1, wherein at least one of the first and second reinforcing bodies includes a conical bore or at least one of the reinforcing bodies includes a conical radially outwardly oriented outer surface.

6. A bearing ring for a bearing assembly including the temperature compensation ring according to claim 1, wherein the base body is in contact with the bearing ring on at least two sides.

7. The bearing ring according to claim 6, wherein the temperature compensation ring is disposed such that the first reinforcing body and the second reinforcing body each cover a region wherein the bearing ring abuts on another component.

8. A bearing assembly comprising the bearing ring according to claim 6 disposed on a second component such that a first gap and a second gap exist between the bearing ring and the second component, wherein the first reinforcing body completely covers the first gap and the second reinforcing body completely covers the second gap.

9. A temperature compensation ring configured to compensate for changes in a temperature-dependent distance between two components, comprising:
   a base body made from an elastic material, and
   a first reinforcing body and a second reinforcing body, each of the first and second reinforcing bodies comprising a harder material than a material of the base body,
   wherein the first and second reinforcing bodies are located at opposite end surfaces of the base body and partially define an outer periphery of the temperature compensation ring, wherein the first and second reinforcing bodies are located in an obliquely opposing manner so that the first reinforcing body is disposed on an inner circumferential edge of the base body and the second reinforcing body is disposed on an outer circumferential edge of the base body, wherein the base body includes first and second recesses on first and second opposing edges, and wherein the first reinforcing body is disposed in the first recess without adhesive and the second reinforcing body is disposed in the second recess, wherein the temperature compensation ring is non-metallic, wherein the reinforcing body includes a projection extending parallel to a side surface, and wherein at least one of the first and second reinforcing bodies includes a conical bore or at least one of the reinforcing bodies includes a conical radially outwardly oriented outer surface.

10. A method, comprising:

disposing at least one mounting aid of a temperature compensation ring on a bearing ring, wherein the at least one mounting aid is configured to center at least one first reinforcing body of a temperature compensation ring in a radial direction, and disposing the at least one first reinforcing body on the bearing ring such that the at least one first reinforcing body is centered by the at least one mounting aid, wherein the at least one first reinforcing comprises first and second reinforcing bodies that are located in an obliquely opposing manner so that the at least one first reinforcing body is disposed on an inner circumferential edge of a base body of a temperature compensation ring and the second reinforcing body is disposed on an outer circumferential edge of the base body.

* * * * *